(No Model.)
J. N. SKINNER.
DRILL CHUCK.
No. 381,857. Patented Apr. 24, 1888.
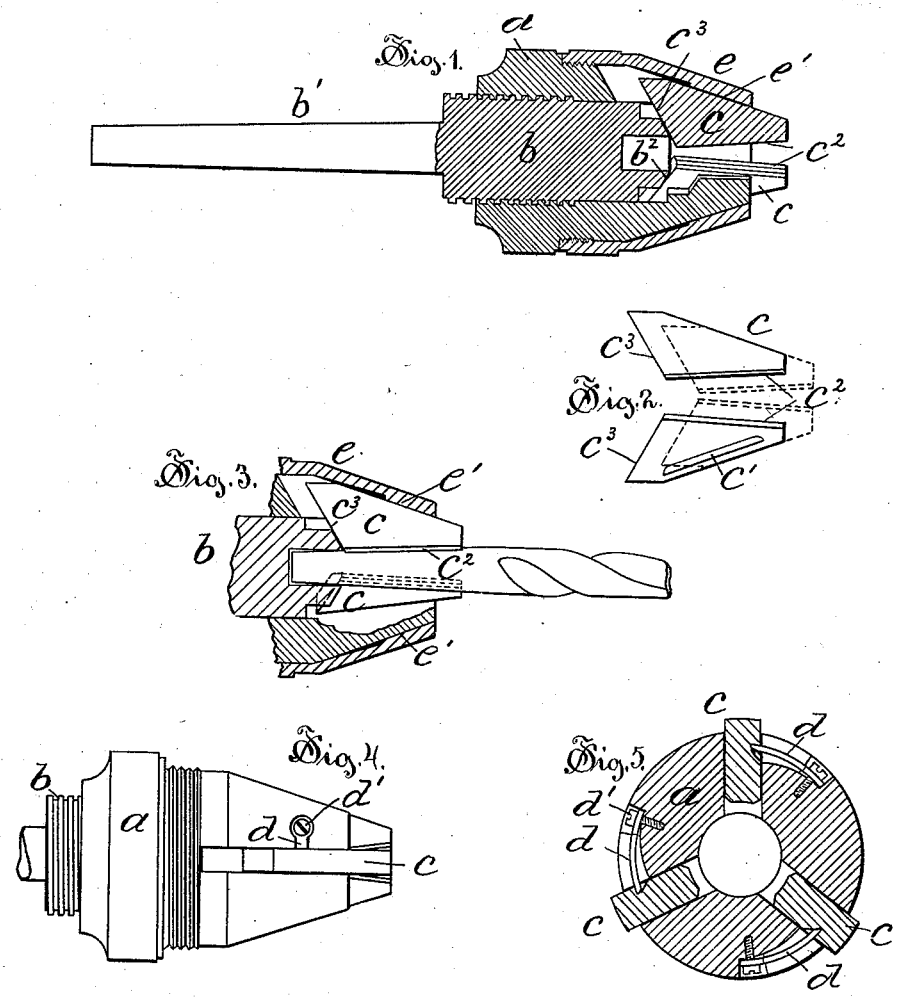
Witnesses:
H. R. Williams.
A. B. Jenkins.
Inventor,
James N. Skinner,
by Simonds & Burdett,
Attys.

UNITED STATES PATENT OFFICE.

JAMES N. SKINNER, OF NEW BRITAIN, CONNECTICUT.

DRILL-CHUCK.

SPECIFICATION forming part of Letters Patent No. 381,857, dated April 24, 1888.

Application filed September 12, 1887. Serial No. 249,415. (No model.)

*To all whom it may concern:*

Be it known that I, JAMES N. SKINNER, of New Britain, in the county of Hartford and State of Connecticut, have invented certain new and useful Improvements in Drill-Chucks, of which the following is a full, clear, and exact description, whereby any one skilled in the art can make and use the same.

My improvement relates to the class of drill-chucks having radially-movable jaws, and my object is to provide a chuck of this class that shall be capable of firmly holding drills, reamers, and like articles that have tapering shanks.

To this end my improvement consists in a drill-chuck having radially-movable jaws, the biting-face of each jaw being located on an angle with the axis of the drill and normally held in such inclined position in all positions of the jaw within the limit of its lengthwise movement in the chuck-body; and it further consists in details of the chuck body, jaw, and clamping device, as more particularly hereinafter described, and pointed out in the claim.

Referring to the drawings, Figure 1 is a detail view, in central longitudinal section, of the chuck. Fig. 2 is a detail diagram view showing the holding-jaws of the chuck in two positions that illustrate the method of operation of the chuck-jaws. Fig. 3 is a detail diagram view of the tapered shank of a twist-drill and in section of a part of the chuck, illustrating the operation of the jaws in holding the drill. Fig. 4 is a detail view of the outside of the chuck-body with the outer shell removed. Fig. 5 is a detail view in section of a part of the body, showing the location of this jaw-holding spring.

In the use of a drill-press or like device prior to my invention a drill or reamer having a tapered shank has been used and held in place in the press or like part by means of clamping-screws and a peculiar collet; but this method of holding the drills is open to the objection that but one-sized drill can be held in each, and that it is difficult to replace the drill in the precise desired axial position after removing it from the holding device. In prior forms of chucks that have been used to grasp the tapered shank of a drill the jaws have been made to rock on their back supports or to slide in a curved bed that would cause the biting-face of the jaw to assume different positions with relation to the axis of the chuck; but such forms are objectionable, for the reason that they have a limited holding-power and require great force to be applied to the clamping parts in order to operate the jaws and hold the drill.

In the accompanying drawings, the letter $a$ denotes a chuck-body having a central opening with a threaded socket, in which is arranged the screw-shaft $b$, that is threaded to fit within the said socket, and has a projecting portion forming the shank $b'$, that is adapted to fit into the head-stock of a lathe or the spindle of a drill-press. The front end of the chuck-body $a$ has a number of longitudinal radial mortises, in which are fitted the jaws $c$. These jaws may be of any convenient number, and they are each held in their respective sockets by means of a spring, $d$, one end of which is secured as by means of a screw, $d'$, taking into the chuck-body, while the other end takes into a groove, $c'$, that extends along the side of each jaw for a limited distance, and the normal tendency of this spring is to hold the chuck-jaw outward from the axis of the drill-chuck. These jaws are each so arranged in their several sockets that they converge toward the center of the chuck-body and have their holding-faces $c^2$ arranged about this center or axis. Outside of the chuck-body is fitted a shell, $e$, that tapers toward the front of the chuck and embraces the several jaws, and forms by its inner surface an annular cam, $e'$, upon which the outer surfaces or backs of the jaws abut. The rear end, $c^3$, of each jaw is formed to receive the thrust of the conical end $b^2$ of the screw-shaft.

The several jaws have a longitudinal movement in their mortises in the chuck-body that is limited by the length of the groove $c'$ in the side of the jaw, and having inserted between the jaws the shank of a drill or like tool, the jaws are closed upon it by rotating the screw-shaft $b$ and forcing the jaws forward by the contact of the conical end $b^2$ of the screw-shaft with the inner end of the jaws, the conical bearing-surface of the shell of the back of the jaws causing the latter to be at the same time moved radially inward. The holding-face $c^2$ of the jaw is placed at an angle with the axis of the chuck, and this angle conforms to that of the standard taper of the shank of a twist-drill in common use. In the movements of the jaws in and out radially of the chuck-body this tapered face of each jaw remains at substantially the same angle with the axis of the chuck-body, so that one chuck may be used to hold varying sizes of tapered shank-drills within the capacity of the chuck.

I am aware that it is not new to provide a drill-chuck with jaws that are movable lengthwise and also radially in the chuck-body, such being shown in United States Patent to Butler, dated January 25, 1887, and numbered 356,616; but in such patented device the jaws move so that their grasping or biting faces are always parallel, whereas in my improved chuck the biting-faces of the jaws are always divergent, with resulting advantages as herein described.

I claim as my invention—

In combination, in a chuck, the chuck-body having the jaw-holding mortises, the conical shell adapted to be secured to the chuck-body and bearing on its inner surface the annular cam, the screw-shaft fitting within the body of the chuck and having its forward end seated on the back of the jaws, and the jaws located in the respective mortises with their backs resting upon the annular cam within the shell, and each jaw having an outward tapered holding-face that is normally at an angle with the axis of the chuck, all substantially as described.

JAMES N. SKINNER.

Witnesses:
CHAS. L. BURDETT,
GEORGE G. HADDOW.